(12) United States Patent
Okamoto

(10) Patent No.: US 8,078,541 B2
(45) Date of Patent: *Dec. 13, 2011

(54) ELECTRONIC MUSICAL APPARATUS FOR RECORDING AND REPRODUCING MUSIC CONTENT

(75) Inventor: Tetsuo Okamoto, Hamamatsu (JP)

(73) Assignee: Yamaha Corporation (JP)

( * ) Notice: Subject to any disclaimer, the term of this patent is extended or adjusted under 35 U.S.C. 154(b) by 511 days.

This patent is subject to a terminal disclaimer.

(21) Appl. No.: 12/355,301

(22) Filed: Jan. 16, 2009

(65) Prior Publication Data

US 2009/0132832 A1  May 21, 2009

Related U.S. Application Data

(62) Division of application No. 11/079,553, filed on Mar. 14, 2005, now Pat. No. 7,818,258.

(30) Foreign Application Priority Data

Mar. 15, 2004  (JP) .................................. 2004-072004

(51) Int. Cl.
*G06F 21/00* (2006.01)
*H04N 7/167* (2011.01)
*G10H 7/00* (2006.01)

(52) U.S. Cl. .............. 705/58; 705/51; 705/57; 380/201; 380/202; 84/645

(58) Field of Classification Search .............. 705/50–59; 380/201, 202; 84/645
See application file for complete search history.

(56) References Cited

U.S. PATENT DOCUMENTS

| | | | |
|---|---|---|---|
| 5,892,900 A | 4/1999 | Ginter et al. |
| 6,025,552 A | 2/2000 | Mukaino et al. |
| 6,480,607 B1 | 11/2002 | Kori et al. |
| 6,701,436 B1 | 3/2004 | Hirai |
| 6,745,166 B1 | 6/2004 | Sugahara et al. |
| 6,834,346 B1 | 12/2004 | Ishibashi et al. |

(Continued)

FOREIGN PATENT DOCUMENTS

EP  1280149 A2  1/2003
(Continued)

OTHER PUBLICATIONS

Search report issued in corresponding European application No. 05101685.8-2212, dated Sep. 22, 2005.

(Continued)

*Primary Examiner* — Calvin L Hewitt, II
*Assistant Examiner* — Steven Kim
(74) *Attorney, Agent, or Firm* — Rossi, Kimms & McDowell LLP

(57) ABSTRACT

In an electronic musical apparatus, a media ID (MD1, MD2, MD3, MD4, MD5) is associated with each recording media of a memory card 8, hard disk device 10, flash memory ROM 11, CD-ROM 12 and internet 15. Each media ID is encrypted to be recorded on a different position in a ROM 2. Upon reading a music content, the media ID of the corresponding recording media is decoded to decode the music content based upon the media ID and the secret key, and then, the resultant is temporarily stored in a RAM 3. Upon writing a music content, it is encrypted based upon the media ID corresponding to a recording media and the secret key, and the content in the RAM 3 is deleted. This makes cryptanalysis hard to thereby enhance a protection level of a music content in an electronic musical apparatus.

6 Claims, 9 Drawing Sheets

U.S. PATENT DOCUMENTS

| | | |
|---|---|---|
| 6,834,348 B1 | 12/2004 | Tagawa et al. |
| 6,934,847 B2 | 8/2005 | Ishizaka |
| 6,971,022 B1 | 11/2005 | Katta et al. |
| 6,999,948 B1 | 2/2006 | Hatanaka et al. |
| 7,469,345 B2 | 12/2008 | Shimada et al. |
| 7,548,887 B1 | 6/2009 | Ogino et al. |
| 2001/0032088 A1 | 10/2001 | Utsumi et al. |
| 2001/0033658 A1 | 10/2001 | Yoshida et al. |
| 2001/0053943 A1 | 12/2001 | Kaneko et al. |
| 2002/0015494 A1 | 2/2002 | Nagai et al. |
| 2002/0154779 A1 | 10/2002 | Asano et al. |
| 2002/0159592 A1 | 10/2002 | Matsushima et al. |
| 2002/0169971 A1 | 11/2002 | Asano et al. |
| 2003/0097340 A1 | 5/2003 | Okamoto et al. |
| 2003/0123670 A1 | 7/2003 | Shimada et al. |
| 2003/0131716 A1 | 7/2003 | Aoki et al. |
| 2004/0030909 A1 | 2/2004 | Sako et al. |
| 2004/0210539 A1 | 10/2004 | Ikeda et al. |
| 2006/0112284 A1 | 5/2006 | Kato et al. |
| 2008/0294562 A1 | 11/2008 | Kasahara et al. |
| 2009/0133565 A1 | 5/2009 | Okamoto |

FOREIGN PATENT DOCUMENTS

| | | |
|---|---|---|
| JP | 11-339373 A | 12/1999 |
| JP | 2000-209195 A | 7/2000 |
| JP | 2001-216727 A | 8/2001 |
| JP | 2001-297486 A | 10/2001 |
| JP | 2002-049377 A | 2/2002 |
| JP | 2003-208163 A | 7/2003 |
| JP | 2004-062957 A | 2/2004 |
| WO | 03/025930 A1 | 3/2003 |

OTHER PUBLICATIONS

Communication from corresponding European application No. 05101685.5-2212, dated May 15, 2007.

Office Action dated Mar. 29, 2011 issued in corresponding Japanese Patent Application No. 2005-072378. English translation provided.

Nichols, Randall K., ICSA Guide to Cryptography, Copyright 1999 by the McGraw-Hill Companies, Inc. On Nov. 16, 2009 in U.S Appl. No. 11/079,553.

Office Action dated Oct. 12, 2010 issued in Japanese Patent Application No. 2005-072378, which claims priority from JP 2004-072004. English Translation provided.

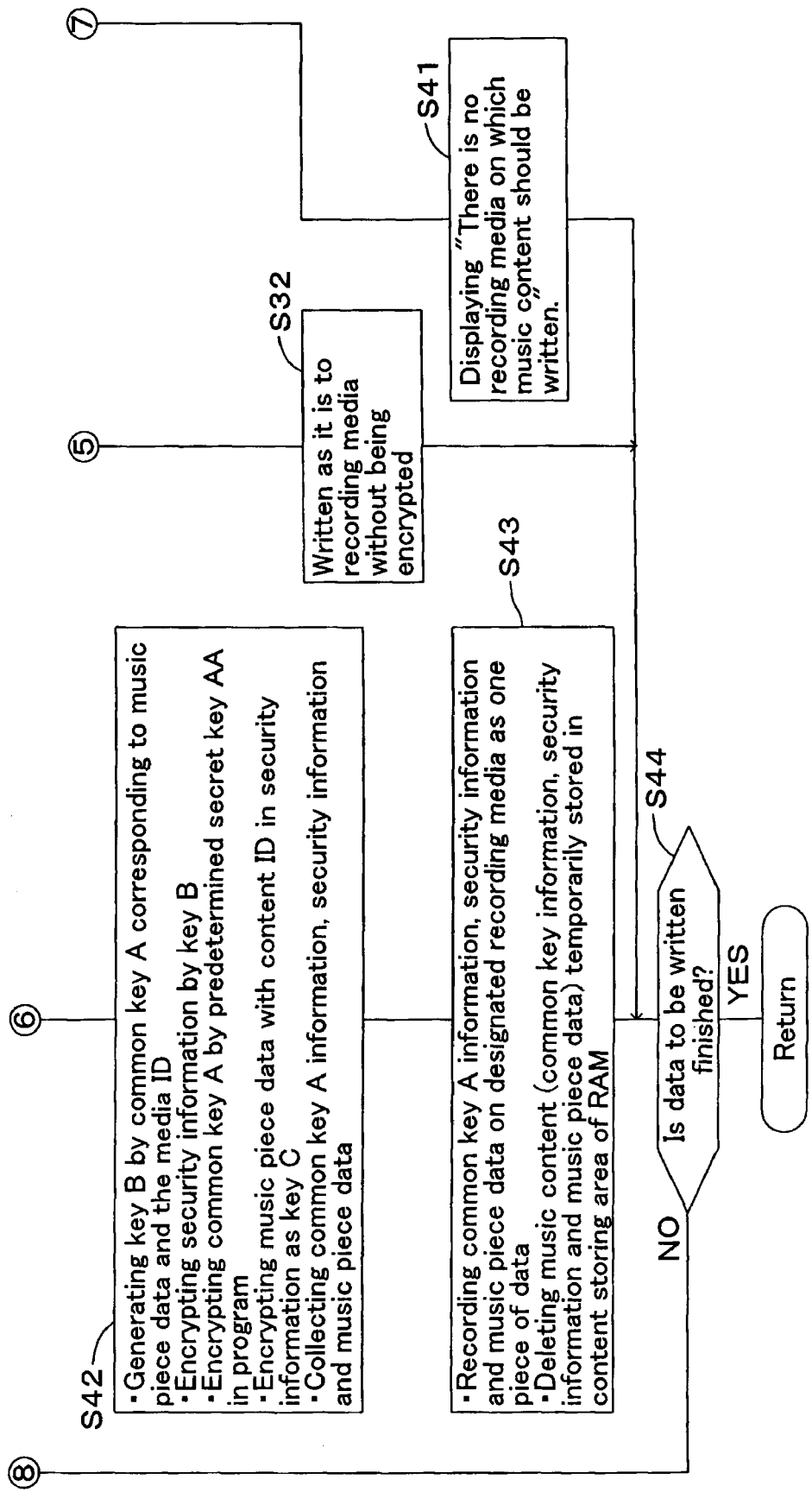

ELECTRONIC MUSICAL APPARATUS FOR RECORDING AND REPRODUCING MUSIC CONTENT

This is a divisional of U.S. patent application Ser. No. 11/079,553 filed Mar. 14, 2005.

BACKGROUND OF THE INVENTION

1. Field of the Invention

The present invention relates to an electronic musical apparatus that is accessible to plural types of recording medias and can read music content, that is encrypted to be recorded, from one optional recording media among the plural types of recording medias and can encrypt the music content to be recorded to one optional recording media, and to a computer-readable program applied to this apparatus.

2. Description of the Prior Arts

Conventionally, there has widely been known an electronic musical apparatus such as an electronic musical instrument or the like that can make an automatic performance based upon music piece data (performance data) composed of MIDI data. Further, there has been proposed an electronic musical instrument that adopts a memory card such as a smart media (registered trademark) as an external memory media, wherein the prestored MIDI music piece data is read from this memory card for an automatic performance or the MIDI music piece data edited or composed by a user is written in the memory card for storage. Moreover, in case where MIDI music piece data or the like (hereinafter suitably referred to as "music content") that needs a copyright protection is read from the external recording media or the like, some electronic musical instruments give management information including a copyright flag to the music content for attempting a copyright protection to protect illegal copy.

A CPU adopted in an electronic musical instrument has increased speed year by year. Further, the electronic musical instrument has incorporated therein a recording media such as a flash memory ROM, CD-ROM/R/RW drive or the like or it can be connected to these recording medias via an interface such as a USB or the like. Therefore, various recording medias are being able to be utilized for electronic musical instruments. Using plural types of recording medias described above leads to the use of various software or various contents, thus enhancing a function of the electronic musical instrument. Moreover, the music content can also be recorded in the various recording medias according to the taste of a user. In this case, it becomes necessary to consider the copyright protection of the music content.

From the viewpoint of the copyright protection, a technique for encrypting music piece data is disclosed in Japanese Unexamined Patent Application No. 2003-208163. This conventional technique discloses that music piece data is transmitted via a network and this music piece data is taken in an electronic musical instrument to execute an automatic performance. Further, in this conventional technique, music piece data is encrypted by using a key (secret key) so as not to allow the illegal use of the auditioning music piece data.

When a secret key is used for an encryption as described above, the secret key is needed for its decode. Therefore, it is necessary to store the secret key in, for example, an electronic musical instrument that is also used as a stand-alone device. Moreover, in case where the music contents respectively stored in the plural types of recording medias are encrypted, the use of common secret key simplifies a processing program, but once the secret key is found, the music contents in all the recording medias are easily decoded, thereby entailing a problem that a level of protection is weak, such as allowing an illegal copy.

SUMMARY OF THE INVENTION

The present invention is accomplished in view of the above-mentioned problems, and aims to make cryptanalysis hard to thereby enhance a protection level of a music content in an electronic musical apparatus that is accessible to plural types of recording medias and can read a music content, that is encrypted to be recorded, from one optional recording media among the plural types of recording medias or can encrypt a music content to be recorded to one optional recording media.

In order to attain the above-mentioned object, an electronic musical apparatus that can reproduce encrypted music contents each recorded in plural types of recording medias is configured as follows. The electronic musical apparatus comprises a storing portion that stores plural media IDs each allocated to each of plural types of recording medias, a media ID obtaining portion that obtains, among the plural media IDs stored in the storing portion, a media ID corresponding to the recording media from which a music content is designated to be read, and a reading portion that reads the encrypted music content from the recording media from which the music content is designated to be read and decodes the read and encrypted music content by using the obtained media ID.

This makes it impossible to decode the encrypted music content so long as the media ID corresponding to the recording media on which the music content is recorded cannot be obtained. Accordingly, the music contents recorded on the plural recording medias cannot freely be reproduced, thereby enhancing a copyright protection of the music contents.

Further, the encrypted music content may include encrypted common key information independent of the types of the recording media, wherein the storing portion may further store a common secret key for decoding the encrypted common key information and the reading portion may be configured as follows. The reading portion may have a common key information decoding portion that decodes the encrypted common key information by using the common secret key, a decoding key generating portion that generates a decoding key for decoding the encrypted music content by using the decoded common key information and the obtained media ID, and a music content decoding portion that decodes the read and encrypted music content by using the generated decoding key.

Moreover, the encrypted music content may include encrypted music piece data representing a music piece, an encrypted music piece data key for decoding the encrypted music piece data and encrypted common key information independent of the types of the recording media, wherein the storing portion may further store a common secret key for decoding the encrypted common key information and the reading portion may be configured as follows. The reading portion may have a common key information decoding portion for decoding the encrypted common key information by using the common secret key, a decoding key generating portion for generating a decoding key for decoding the encrypted music piece data key by using the decoded common key information and the obtained media ID, a music piece data key decoding portion for decoding the encrypted music piece data key included in the read and encrypted music content by using the generated decoding key, and a music piece data decoding portion for decoding the encrypted music piece data included in the read and encrypted music content by using the decoded music piece data key.

This makes the procedure for decoding complicated, thereby further enhancing a copyright protection of a music content.

Further, an electronic musical apparatus that can encrypt music contents and record the encrypted music contents in plural types of recording medias is configured as follows. The electronic musical apparatus comprises a storing portion that stores plural media IDs each allocated to each of plural types of recording medias, a media ID obtaining portion that obtains, among the plural media IDs stored in the storing portion, a media ID corresponding to the recording media into which a music content is designated to be written, and a writing portion that encrypts the music content by using the obtained media ID and writes the encrypted music content in the designated recording media.

Further, the music content may include common key information independent of the types of the recording media, wherein the storing portion may further store a common secret key for encrypting the common key information and the writing portion may be configured as follows. The writing portion may have an encryption key generating portion for generating an encryption key by using the common key information and the obtained media ID, a music content encrypting portion for encrypting the music content by using the generated encryption key, a common key information encrypting portion that encrypts the common key information by using the common secret key, and a music content writing portion that writes the encrypted music content including the encrypted common key information in the designated recording media.

Moreover, the music content may include music piece data representing a music piece, a music piece data key for encrypting the music piece data and common key information independent of the types of the recording media, wherein the storing portion may further store a common secret key for encrypting the common key information and the writing portion may be configured as follows. The writing portion may have a music piece data encrypting portion for encrypting the music piece data by using the music piece data key, an encryption key generating portion for generating an encryption key by using the common key information and the obtained media ID, a music piece data key encrypting portion for encrypting the music piece data key by using the generated encryption key, a common key information encrypting portion for encrypting the common key information by using the common secret key, and a music content writing portion that writes the encrypted music content including the encrypted music piece data, the encrypted music piece data key and the encrypted common key information in the designated recording media.

This allows the complicatedly encrypted music content to be recorded in the recording media, thereby further enhancing a copyright protection of the music content.

Further, the music content read from one recording media of plural recording medias as described above may be stored in temporal storing portion, and then, the music content stored in the temporal storing portion may be automatically written in the other one recording media by the manner described above. Specifically, the music content can be transferred among plural types of recording medias with a specific cryptographic process performed every recording media. In this case, the music content stored in the temporal storing portion may automatically be deleted after the music content is written in the other one recording media.

According to this, even if the music content is transferred from one recording media to the other one recording media among plural recording medias, the music content is encrypted and recorded according to the recording media to which the music content is to be transferred, thereby enhancing a copyright protection of the music content.

Further, the invention is not limited to an electronic musical apparatus upon embodying the invention, but it can be embodied as an invention of a computer-readable program and an invention of a method applied to an electronic musical apparatus.

BRIEF DESCRIPTION OF THE DRAWINGS

FIGS. 6A and 6B are flowcharts showing a writing routine in the embodiment; and

DESCRIPTION OF THE PREFERRED EMBODIMENT

Figure 1:
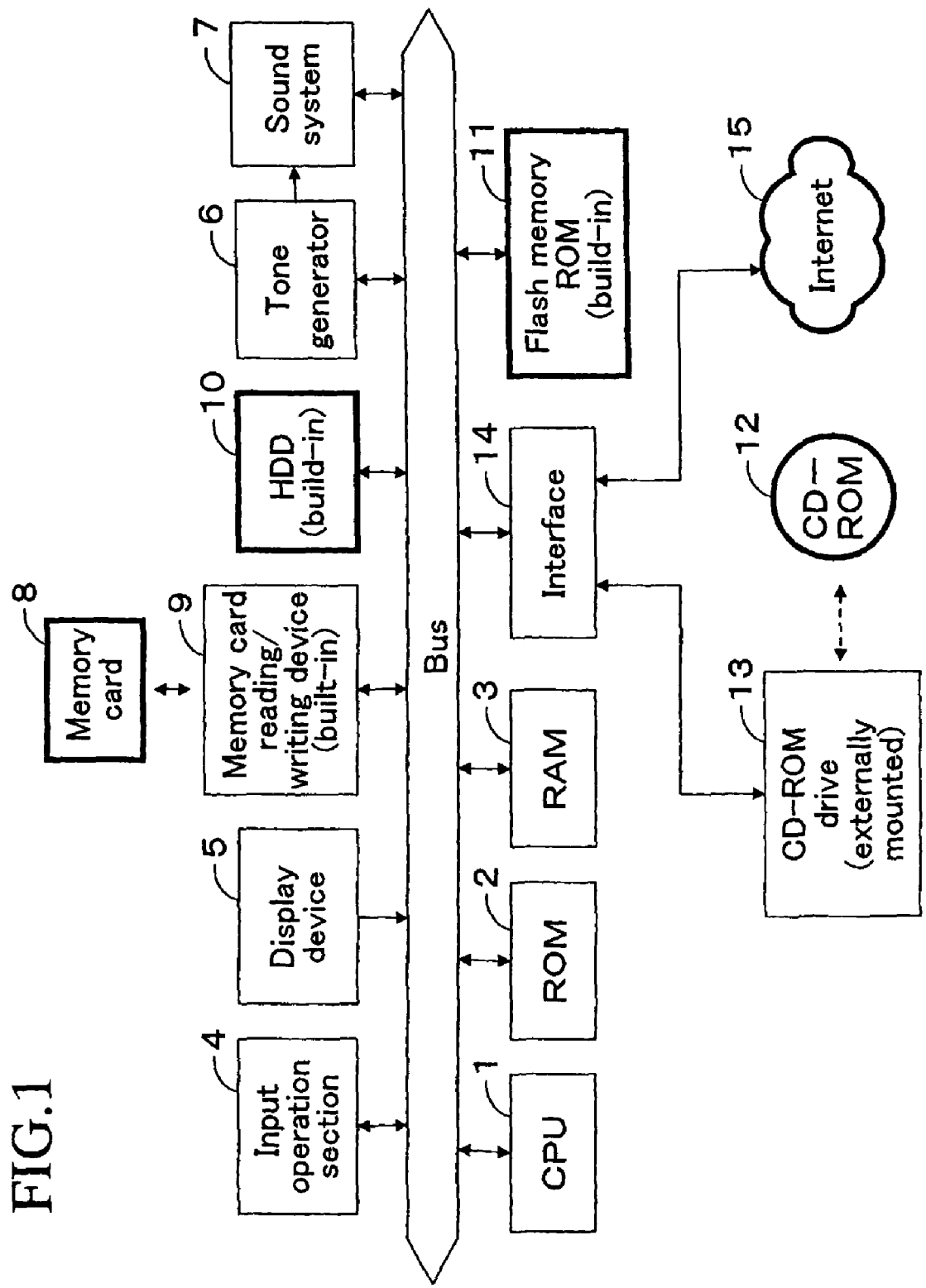
FIG. 1 is a block diagram of a hardware configuration of an electronic musical apparatus and peripherals according to an embodiment of the present invention.

FIG. 1 is a block diagram showing a hardware configuration of an electronic musical instrument and peripherals in an embodiment of the present invention, wherein a CPU 1 (a control portion) entirely controls the electronic musical instrument by using a working area in a RAM 3 based upon a control program stored in a ROM 2. As a basic function of a general electronic musical instrument, the CPU 1 detects an operation event of a keyboard or the like at an input operation section 4 to control a manual performance. Further, it detects an operation event of a panel operation elements or the like at the input operation section 4 to perform a process according to the operation of each operation element. Moreover, it controls a display on a display device 5 such as a liquid crystal panel or the like. A tone generator 6 generates a tone signal according to various data set from the CPU 1 by a keyboard performance or automatic performance and outputs the tone signal to a sound system 7. The sound system 7 performs D/A conversion or amplification of the tone signal and sounds out the resultant with speakers.

This electronic musical instrument is, as a recording media or its drive device, provided with a memory card reading/writing device 9 that performs read/write of data to a memory card 8, a hard disk device (HDD) 10 that performs read/write of data to a built-in hard disk, a flash memory ROM 11 that performs read/write of data to an internal memory area and a CD-ROM drive 13 that reads data from a CD-ROM 12. Among these, the memory card reading/writing device 9, hard disk device 10 and flash memory ROM 11 are incorporated in the body of the musical instrument, while the CD-ROM drive 13 is externally mounted with a USB cable via an interface 14. Further, it is connectable to internet 15 via the interface 14. Specifically, the memory card 8, hard disk device 10, flash memory ROM 11, CD-ROM 12 and sites of the internet 15 are defined as plural recording medias of different type in this embodiment.

A media ID (hereinafter referred to as "MD1, MD2, MD3, MD4, MD5" in that order), each being different from one another, is allocated to the memory card reading/writing device 9, hard disk device 10, flash memory ROM 11, CD-ROM drive 13 and internet connecting section of the interface 14 respectively. These media IDs are encrypted and written in a predetermined area of a control program stored in the ROM 2 (a storing portion). By this process, the media ID is set to each recording media in the electronic musical instrument. Any information is available as the media ID as long as it can be used as secret key information. Preferably, the pieces of information can be inferred easily and are different from each other.

Figure 2:
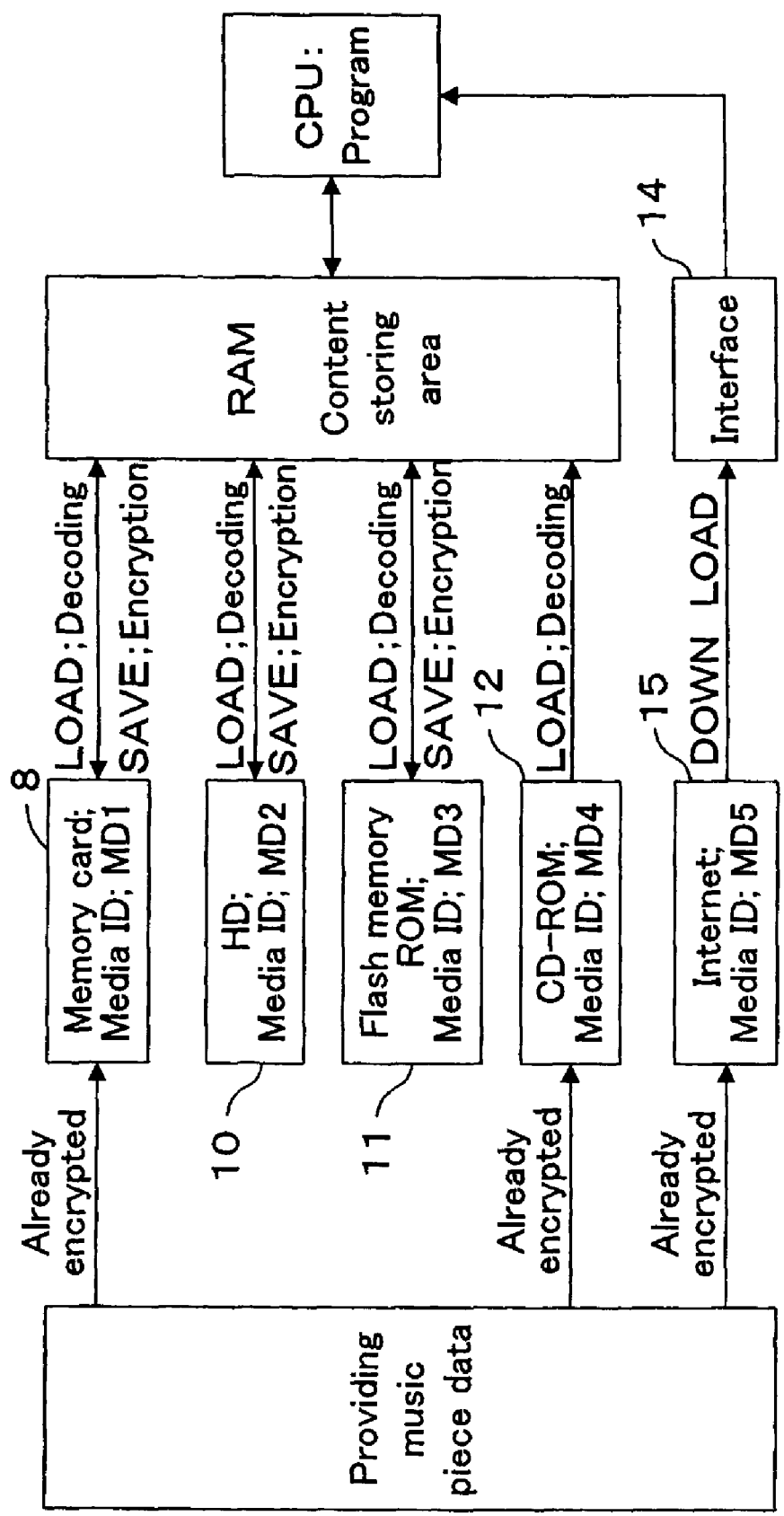
FIG. 2 is a view showing an outline of a process to music piece data handled by the electronic musical apparatus of the embodiment and each recording media.

FIG. 2 is a view showing music piece data handled by the electronic musical instrument in this embodiment and an outline of a process to each recording media. A block of "providing music piece data" is a seller of the memory card 8 and CD-ROM 12 having the music piece data recorded thereon or a site on the internet 15 providing transmission service or selling service of the music piece data. The music piece data provided by the memory card 8, CD-ROM 12 and internet 15 is encrypted in advance for the electronic musical instrument by a secret key described below based upon the media ID (the same media ID in the electronic musical instrument) corresponding to each recording media. The music piece data already encrypted is provided by the corresponding recording media.

The encrypted music piece data in the memory card 8 and the CD-ROM 12 is decoded by the secret key based upon each media ID (MD1, MD4) by reading (LOAD). Further, the encrypted music piece data downloaded from the internet 15 is decoded by the secret key based upon the media ID (MD5). Each decoded music piece data is stored in a content storing area (a temporal storing portion or temporal storing device) in the RAM 3. Further, the music piece data is encrypted and can be saved in the recording media on which a recording is possible such as the memory card 8, hard disk device 10 and the flash memory ROM 11 by a secret key based upon each media ID. However, the music piece data that needs a copyright protection, i.e., the encrypted music piece data cannot be copied but can only be transferred among the readable and recordable recording medias.

Figure 3:
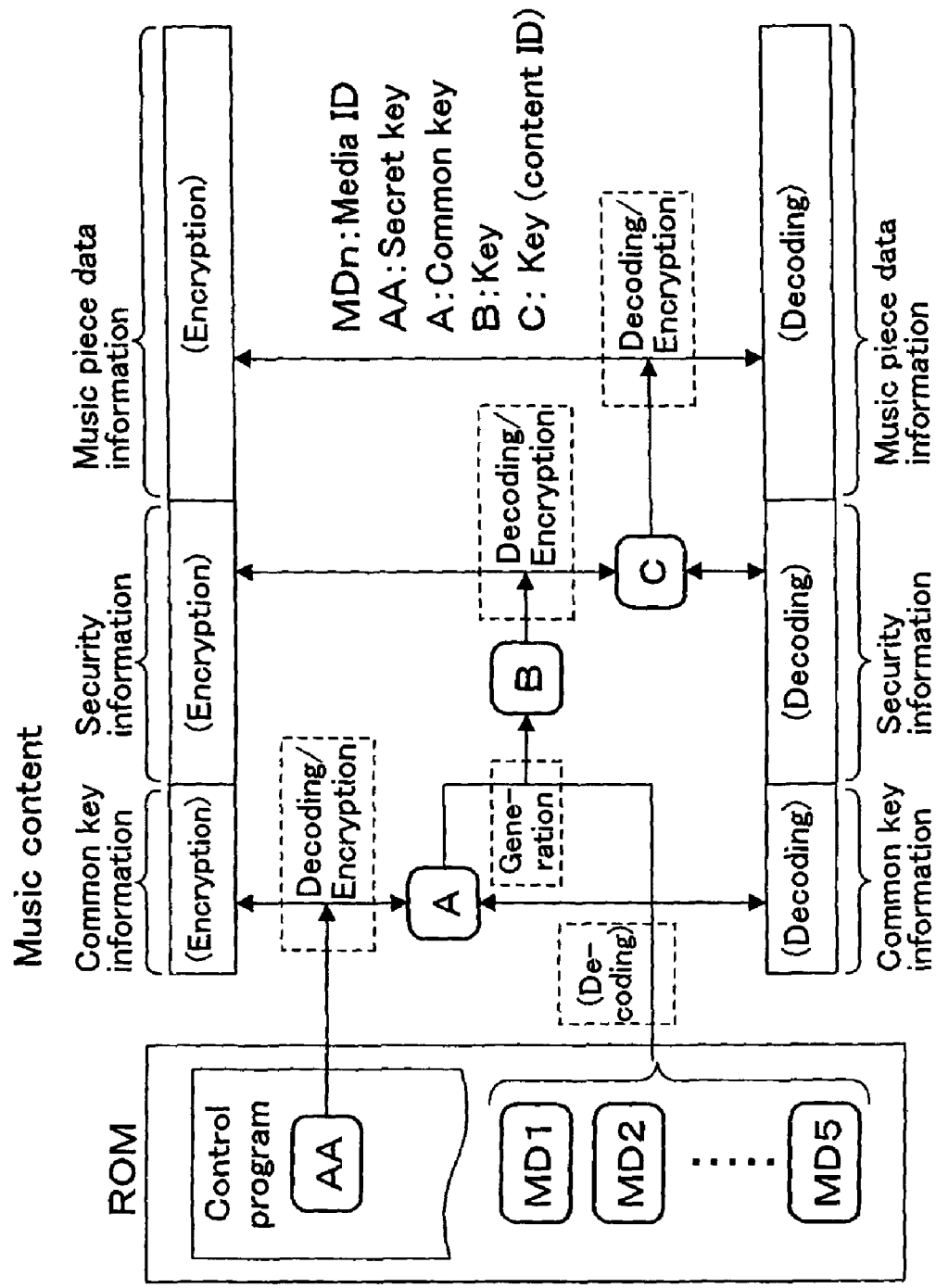
FIG. 3 is a conceptional view showing a data structure of encrypted music content and a procedure for decode and encryption.

FIG. 3 is a conceptional view of a data structure of the encrypted music content and a procedure of decoding and encryption. The data of the music content is composed of common key information, security information and music piece data. These pieces of information are encrypted respectively. The common key information includes a common key A set based upon a random value. The security information includes a file name, name of works, copyright information (flag) and content ID. The content ID is a single content ID for whole data of the music content. This content ID functions as a key C (music piece data key) described later for decoding the music piece information. The music piece data information includes MIDI music piece data, logical score data, style (performance data for accompaniment), registration (data for designating a tone or effect of an electronic organ) or the like.

The ROM 2 (a storing portion) stores a control program and media IDs (MD1, MD2, MD3, MD4, MD5) each corresponding to each recording media. These media IDs are stored at the respective places (addresses) apart from one another, each ID being subject to different encryption by a predetermined secret key different from every recording media. It should be noted that, since the storing place and encryption process of the media ID is determined in advance every recording media, the reading and decoding of the media ID according to each recording media is of course possible by the execution of the control program in the electronic musical instrument. Further, a predetermined secret key AA (common secret key) is stored in the control program of the ROM 2. This secret key AA is for decoding the common key information in the music content and encrypting the decoded common key information.

In case where the encrypted music content is decoded, the data of the common key information is firstly decoded by the secret key AA in the control program to obtain the common key A. Then, the media ID corresponding to the recording media of the music content is decoded to be read, wherein a predetermined calculation or the like is performed to generate a key B (decoding key) for decoding the security information by using the media ID and the common key A. Further, the security information is decoded by this key B to obtain the content ID therein as a key C (music piece data key). Then, the music piece data information is decoded by this key C. The keys A, B and C, media ID and music piece data obtained by this decoding are temporarily stored in the content storing area (a temporal storing portion or temporal storing device) of the RAM 3 with decoded state. The music piece data or the like is read according to the predetermined program to be suitably used for an automatic performance or the like.

Subsequently explained is a procedure for encryption upon recording the decoded music content in the memory card 8, hard disk device 10 and flash memory ROM 11. When the security information of the music content that is to be encrypted (recorded) is designated, a key B (encryption key) is firstly generated by the common key A of the common key information of the music content corresponding to the security information and the media ID of the recording media where the music content is to be recorded. The security information (including the content ID (music piece data key)) is encrypted by the key B and the common key information including the common key A is encrypted by the predetermined secret key AA (common secret key) in the control program. Then, the music piece data information is encrypted by the key C (music piece data key) that is the content ID before the encryption.

Figure 4:
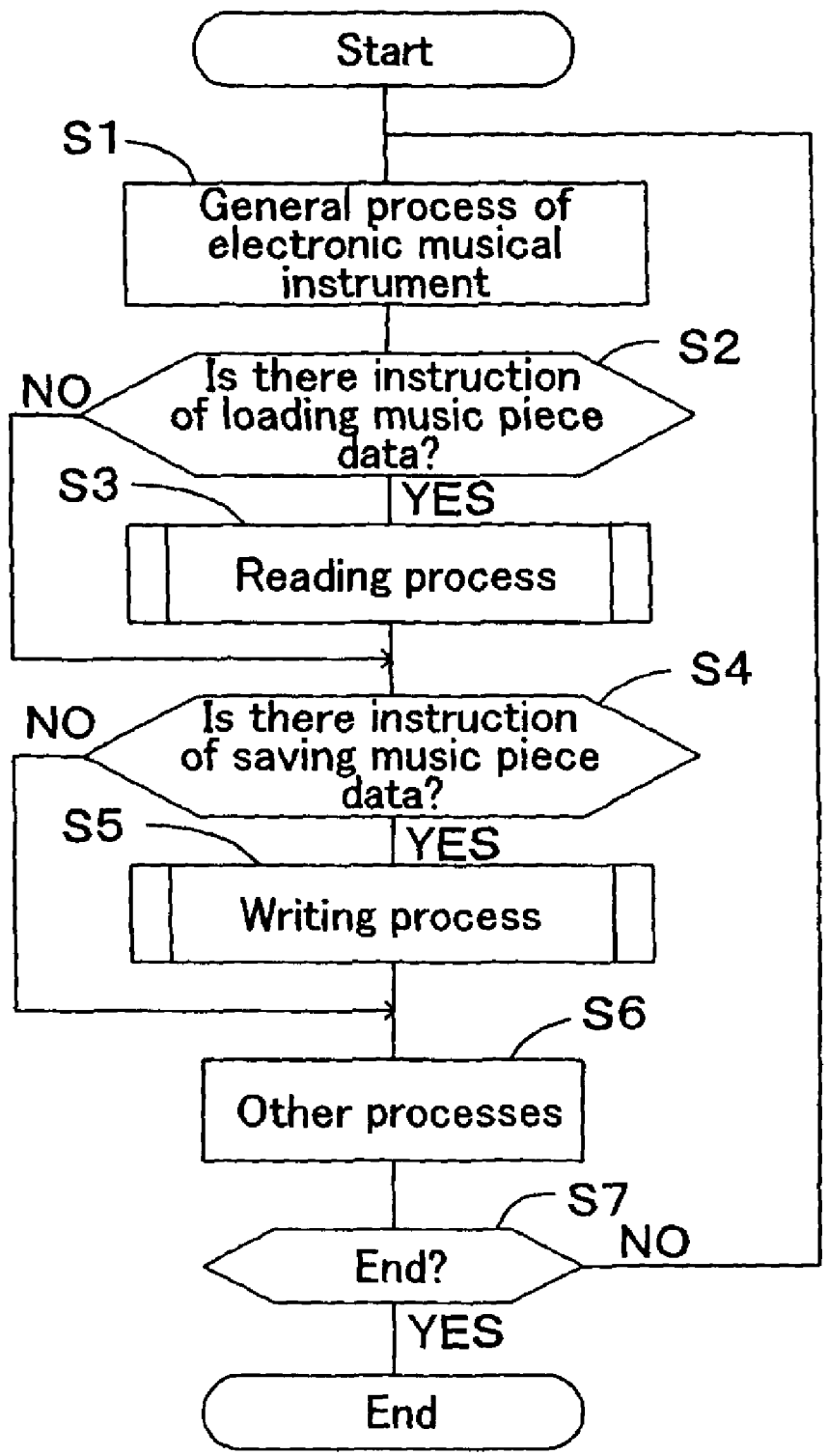
FIG. 4 is a flowchart showing a main routine in the embodiment.
Figure 5A:
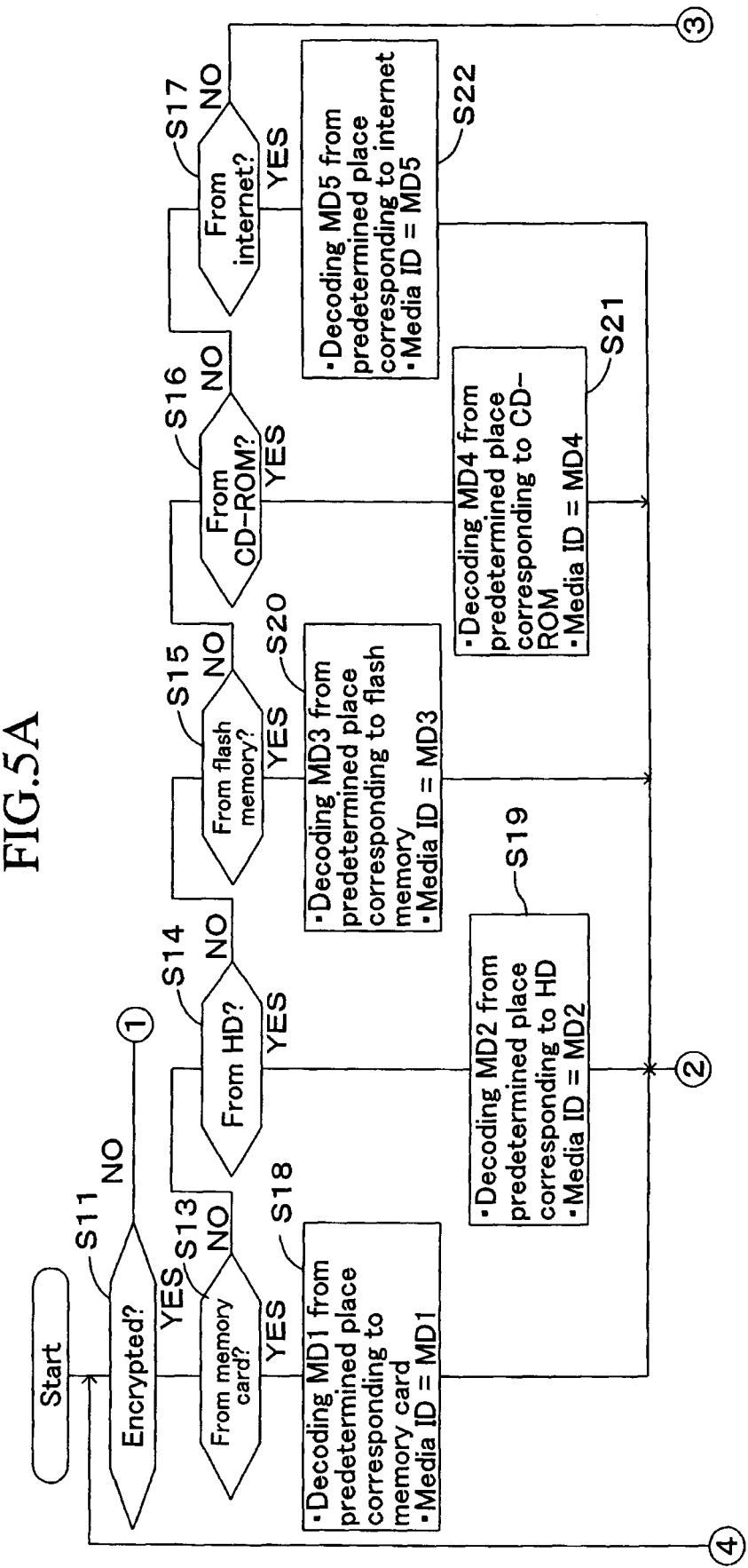
FIGS. 5A and 5B are flowcharts showing a reading routine in the embodiment.
Figure 5B:
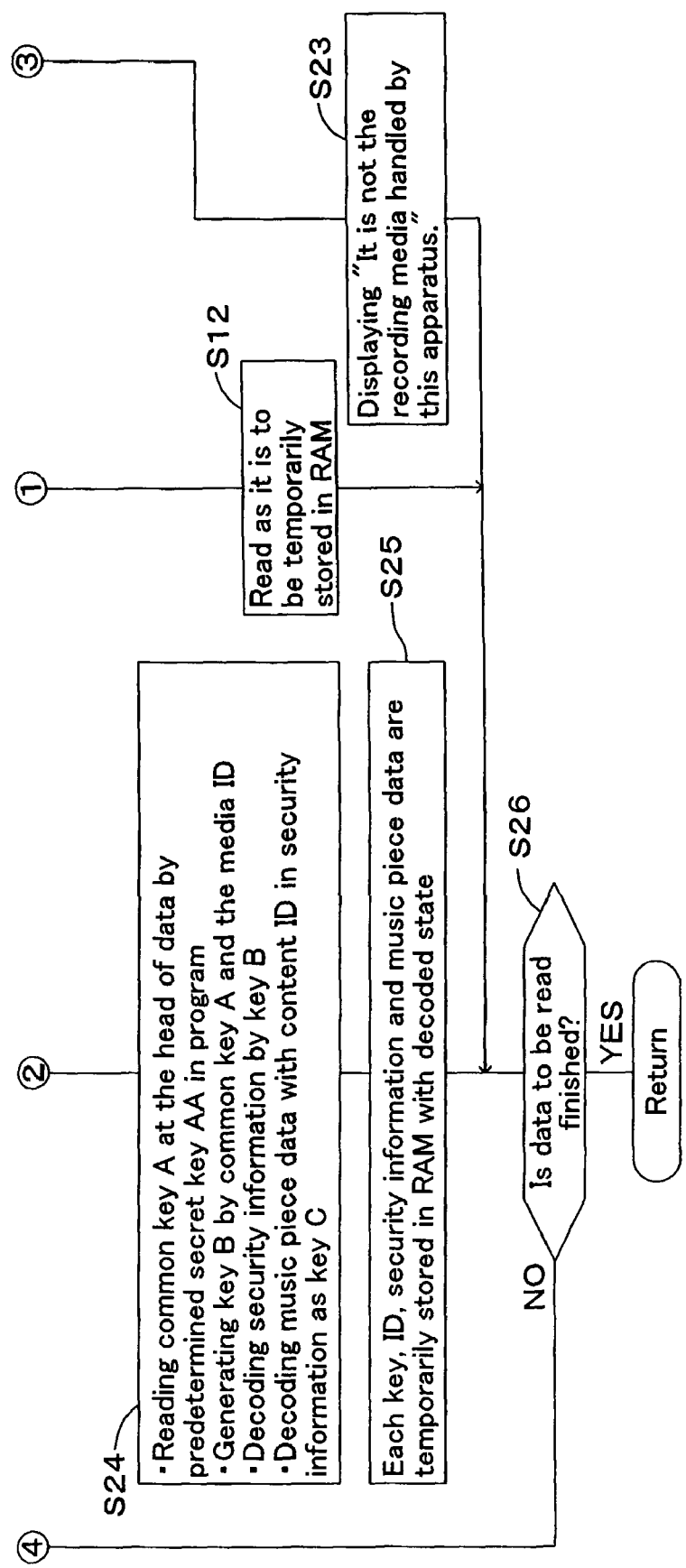
Figure 6A:
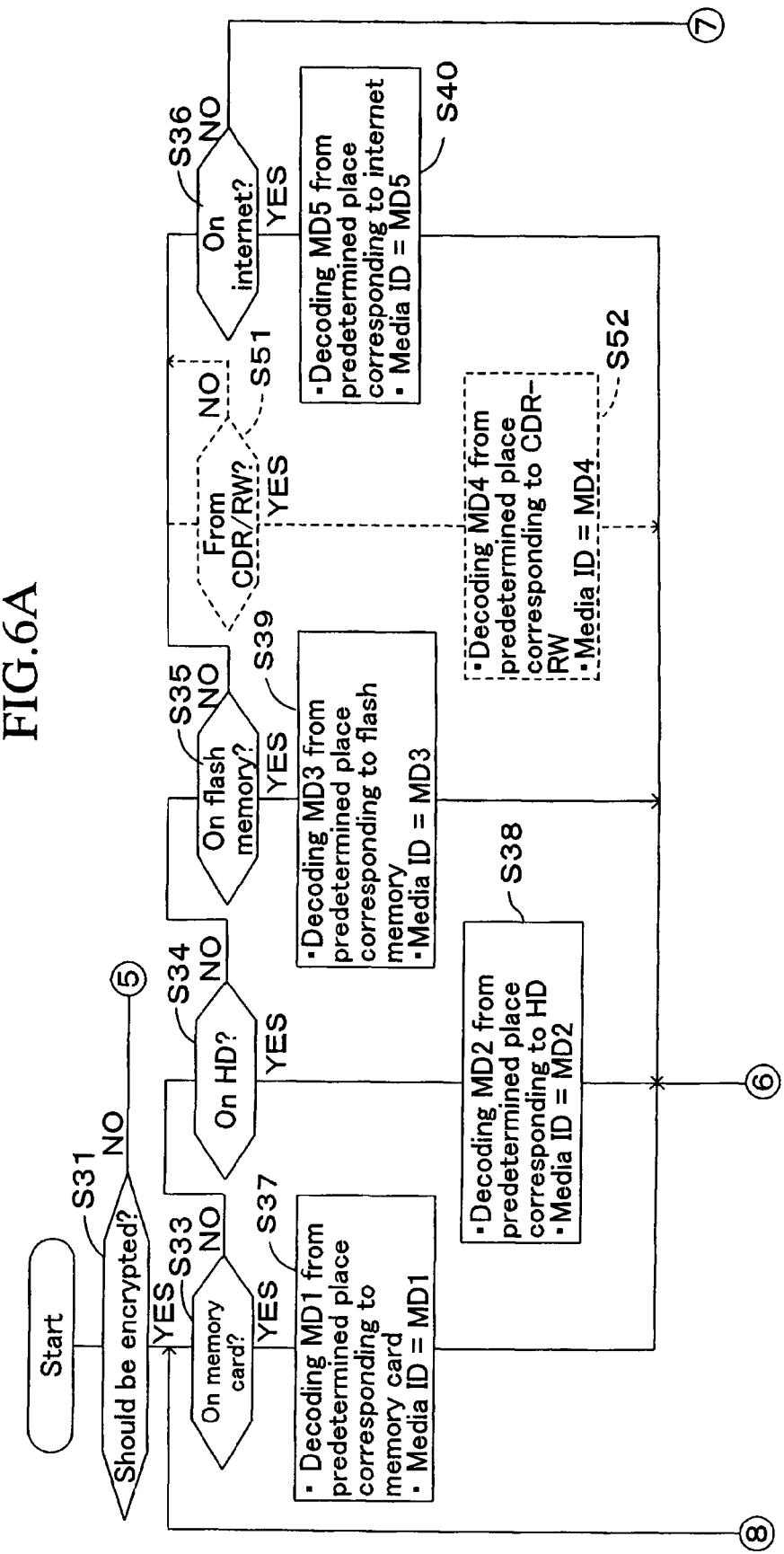

FIG. 4 is a flowchart showing a main routine of the embodiment, FIGS. 5A and 5B are flowcharts showing a reading routine and FIGS. 6A and 6B are flowcharts showing a writing routine. The process of each routine is performed based upon the execution of the control program by the CPU 1 (a control portion). In the main routine in FIG. 4, a general process of the electronic musical instrument is performed at step S1 such as an activation such as initialization, a process corresponding to the operation on the operation panel at the input operation section 4, a sound-out process based upon the performance on the keyboard at the input operation section 4, an automatic performance process based upon the music piece data, a performance guide process such as turning on a depressed key guide lamp, a designating process of the music content temporarily stored at the content storing area in the RAM 3, a designating process of the recording media composed of the memory card 8, hard disk device 10, flash memory ROM 11, CD-ROM drive 13 (CD-ROM 12) and internet 15, a designating process of the music content in the recording media or the like.

Subsequently, it is determined at step S2 whether there is an instruction of loading of the music piece data or not. If there is no instruction of loading, the program proceeds to step S4. If there is an instruction of loading, the process of the reading routine in FIGS. 5A and 5B is performed at step S3, and then, the program proceeds to step S4. It is determined at step S4 whether there is an instruction of saving the music piece data or not. If there is no instruction of saving, the program proceeds to step S6. If there is an instruction of saving, the process of the writing routine in FIGS. 6A and 6B is performed at step S5, and then, the program proceeds to step S6. The other processes are performed at step S6, whereupon the processes at step S1 and the following steps are repeated unless the process is ended by turning off a power source at step S7.

In the reading routine shown in FIGS. 5A and 5B, it is determined at step S11 whether the music content is encrypted or not. If not encrypted, the music content is read as it is to be temporarily stored in the content storing area in the RAM 3, and then, the program proceeds to step S26. If encrypted, the processes at the step S13 and the following steps are performed. As to whether the music content is encrypted or not, a general reading operation is carried out, for example, and the determination may be made that the music content is encrypted if it cannot be read, or the fact that the music content is encrypted in advance may be recorded to the music content.

It is determined at steps S13 to S17 from what type of recording media the music content is read, and steps S18 to S22 execute a process according to each recording media. Specifically, at steps S18 to S22, the data of the media ID corresponding to the recording media is read from the place (address) corresponding to the recording media, from which the music content is read, in the ROM 2, and the read media ID is decoded, wherein the decoded value (MD1 to MD 5) is stored as the corresponding media ID. Then, the program proceeds to step S24. If the recording media is not determined to be any one of the recording medias corresponding to MD1 to MD5, a warning is displayed at step S23 such as, for example, "It is not the recording media handled by this apparatus" or the like, and the program proceeds to step S26.

As explained at FIG. 3, at step S24, the common key information is decoded by using the secret key AA to thereby obtain the common key A, whereby the key B (decoding key) is generated by the common key A and the media ID to decode the security information by the key B. The music piece data is decoded with the content ID in this decoded security information defined as the key C (music piece data key). Subsequently, at step 25, each key, ID, security information and music piece data are temporarily stored (virtual storage) in the content storing area in the RAM 3 with the decoded state. Then, the program returns to step S11 unless the data to be read is ended at step S26, while the program returns to the original routine if ended.

The writing routine shown in FIGS. 6A and 6B is activated when the music content is read from the recording media as decoded to be temporarily stored (virtual storage) in the content storing area (a temporal storing portion or a temporal storing device) in the RAM 3 by the process of the reading routine shown in FIGS. 5A and 5B and when the music content is selected at step S1 in FIG. 4 (when the music piece data and the corresponding security information are designated). Specifically, the writing routine is a process for encrypting the music content that is decoded and temporarily stored in the RAM 3 and writing the resultant to the recording media, in response to the determination of saving instruction of the music piece data by step S4 in FIG. 4. Firstly, it is determined at step S31 whether the music content should be encrypted or not. If it is not the one that should be encrypted, the music content is written in the recording media without being encrypted at step S32, and the program proceeds to step S44. If it should be encrypted, the processes at step S33 and the following steps are performed. Whether the music content should be encrypted or not is determined by the copyright information (flag) of the security information or the like.

It is determined at steps S33 to S36 on what type of recording media the music content is written. The process according to each recording media is performed at steps S37 to S40. It should be noted that steps S51 and S52 shown by a broken line will be described later. At steps S37 to S40, the data of the media ID corresponding to the recording media is read from the place (address) corresponding to the recording media, on which the music content is to be written, in the ROM 2, and the read media ID is decoded, wherein the decoded value (MD1 to MD3, MD5) is stored as the corresponding media ID. Then, the program proceeds to step S42. If the recording media is not judged to be any one of the recording medias corresponding to MD1 to MD5, a warning is displayed at step S41 such as, for example, "There is no recording media on which music content should be written" or the like, and the program proceeds to step S44.

As explained at FIG. 3, at step S42, the key B (encryption key) is generated by using the common key A and the media ID to thereby encrypt the security information (music piece data key) by the key B. Further, the common key A is encrypted by the secret key AA. Moreover, the music piece data is encrypted with the content ID in this security information defined as the key C (music piece data key), and the information of the common key A, security information and music piece data are collected as one music content. Then, the music content in which the information of the common key A, security information and music piece data are collected is recorded on the designated recording media and the music content temporarily stored (virtual storage) in the RAM 3 is deleted at step S43. Then, the program returns to step S31 unless the data to be written is ended at step S44, while the program returns to the original routine if ended.

The above-mentioned embodiment explains about the case where the CD-ROM drive 13 performs reading from the CD-ROM 12. However, in case where the CD-ROM drive 13 has a function to write in the CDR/RW, steps S51 and S52 shown by a broken line in FIG. 6 may be executed. Specifically, when it is determined at step S51 whether the writing is performed to the CDR/RW, the data of the media ID corresponding to the CDR/RW is read from the place (address) corresponding to the CDR/RW in the ROM 2, and the read data is decoded to be stored as the media ID at step S52. Then, the program proceeds to step S42.

The above-mentioned embodiment does not basically consider remodeling the device, but in this embodiment, a media ID (media number) common to every type of the recording media is set to encrypt the music piece data. Accordingly, when a recording media (other than the flash memory) for a first electronic musical instrument is removed and attached to a second electronic musical instrument different from the first electronic musical instrument, the music piece data utilized for the first electronic musical instrument can be utilized for the second electronic musical instrument. The flash memory (ROM) is fixed on a substrate by a soldering, so that it cannot be removed. This can be eliminated as follows except for the CD-ROM. As for a memory card that is easily removed, the one with an ID number is adopted. After a different encryption is performed for every memory card, data is recorded on the memory card. As for a hard disk device, each one is encrypted based upon each format/serial number that is a numerical value different from each hard disk device, and then, recording is performed. This means that a ID storing portion provided every type of recording media for storing the media ID is not only provided at the ROM 2 but also provided every recording media. According to this, the music piece data can be decoded only by a single electronic musical instrument.

Figure 7:
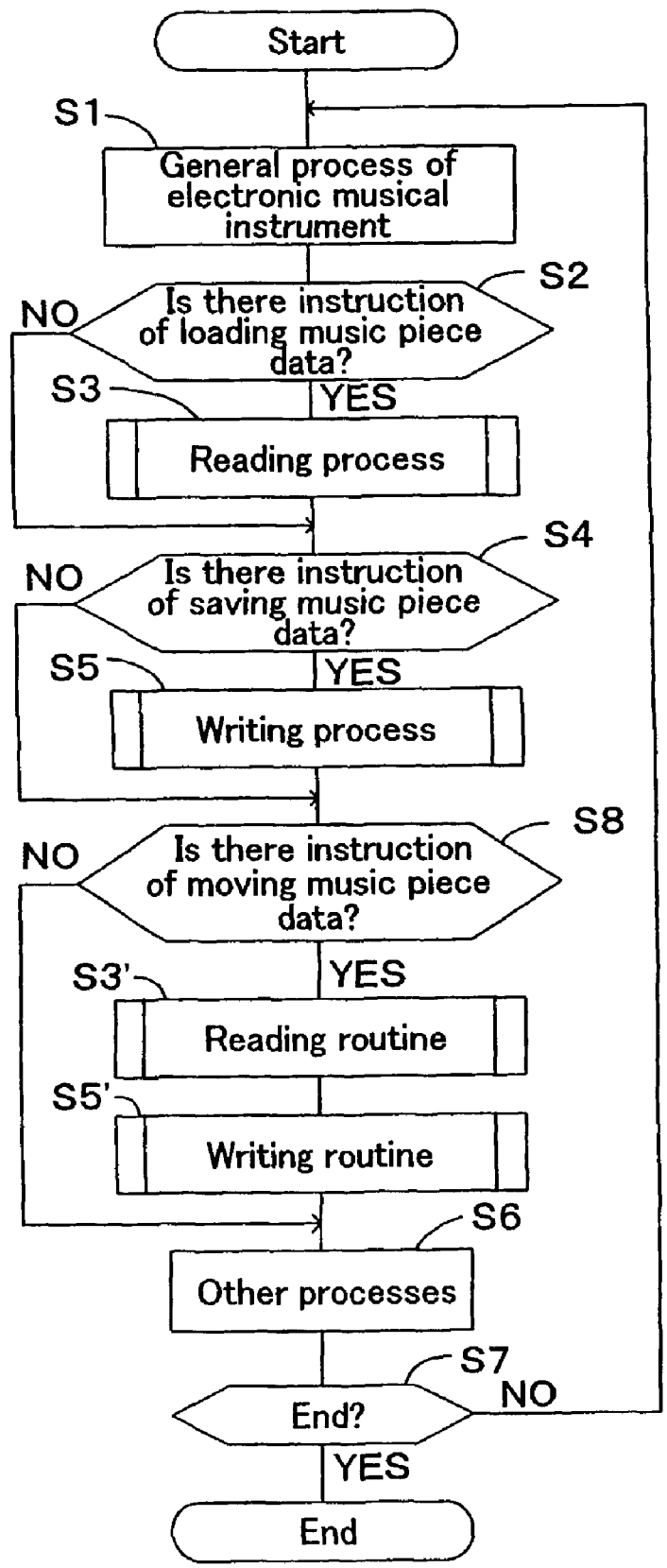
FIG. 7 is a flowchart showing a modified example of the main routine.

Further, the aforesaid embodiment independently performs that the music piece data recorded on one recording media among plural recording medias is temporarily stored in the RAM 3 and that the music piece data temporarily stored in the RAM 3 is recorded on one recording media among plural recording medias. However, in addition to this, the music content recorded on one recording media among plural recording medias can also be transferred to the other one recording media among plural recording medias. In this case, the CPU 1 executes the main routine shown in FIG. 7 wherein processes at steps S8, S3' and S5' are added between the step S5 and step S6 in FIG. 4.

In this main routine, when the music content is instructed to be moved by the process corresponding to the operation on the operation panel at the input operation section 4 at step S1, the CPU 1 makes "YES" determination at step S8 to automatically successively execute steps S3' and S5'. The processes at steps S3' and S5' are the same as those at steps S3 and S5. It should be noted that, in this case, one recording media having recorded thereon the music content that is to be moved and the music content in the recording media are designated as well as the recording media to which the music content is moved to be recorded is also designated. By this, the music content recorded in the designated one recording media is decoded by the same manner as in the above-mentioned embodiment and temporarily stored in the RAM 3. Thereafter, the temporarily stored music content is automatically read from the RAM 3 to be recorded on the designated one recording media as encrypted by the same manner as in the above-mentioned embodiment. Further, the music content in the RAM 3 is deleted thereafter.

Moreover, the security information is decoded and encrypted by the key B as well as the music piece data information is decoded and encrypted by the key C (music piece data key) in the security information in the aforesaid embodiment and modified example. However, instead of this, the music piece data information and the security information (not including the key C that is the content ID) may be decoded and encrypted by the key B (decoding key and encryption key), omitting the key C (music piece data key) that is the content ID in the security information.

Further, the invention is not limited to the above-mentioned embodiment, but various modifications are possible without departing from the spirit of the invention upon embodying the present invention.

What is claimed is:

1. An electronic musical apparatus for encrypting and recording music contents onto any one of plurality types of music content recording destinations, the electronic musical apparatus comprising:
    a storage device for storing a secret key and a plurality of target IDs each unique to one of the plurality types of music content recording destinations;
    a temporary memory device for storing common key information, security information, and music piece information;
    a memory device; and
    a processor coupled to the memory device,
    wherein the memory device stores executable instructions that when executed by the processor causes the processor to perform the operations of:
    determining a type of one of the music content recording destinations;
    retrieving the target ID of the determined type of the one of the music content recording destinations and the secret key from the storage device;
    retrieving the common key information, the security information, and the music piece information from the temporary memory device, wherein the common key information includes a common key, wherein the security information includes copyright information and a content ID;
    retrieving the content ID from the retrieved security information;
    encrypting the retrieved music piece information using the retrieved content ID;
    retrieving the common key from the retrieved common key information;
    generating a first key using the retrieved common key and the retrieved target ID;
    encrypting the retrieved security information with the first key;
    encrypting the retrieved common key information with the retrieved secret key;
    writing the encrypted security information, the common key information, and the music piece information to the determined type of the one of the music content recording destinations.

2. The electronic musical apparatus according to claim 1, wherein the content ID is a security key.

3. A non-transitory computer-readable storage medium storing a computer program executable by an electronic musical apparatus to carry out a method of encrypting and recording music contents onto any one of plurality types of music content recording destinations, the electronic musical apparatus having a storage device, a temporary memory device, a memory device storing the computer program, and a processor coupled to the memory device, the method comprising:
    a first storing step of storing in the storage device a secret key and a plurality of target IDs each unique to one of the plurality types of music content recording destinations;
    a second storing step of storing in the temporary memory device common key information, security information, and music piece information;
    a determining step of determining a type of the one of the music content recording destinations;
    a target ID retrieving step of retrieving the target ID of the determined type of the one of the music content recording destinations and the secret key from the storage device;
    a first retrieving step of retrieving the common key information, the security information, and the music piece information from the temporary memory device, wherein the common key information includes a common key, wherein the security information includes copyright information and a content ID;
    a content ID retrieving step of retrieving the content ID from the retrieved security information;
    a retrieved music piece information encryption step of encrypting the retrieved music piece information using the retrieved content ID;
    a common key retrieving step of retrieving the common key from the retrieved common key information;
    a first key generating step of generating a first key using the retrieved common key and the retrieved target ID;
    a security information encrypting step of encrypting the retrieved security information with the first key;
    a retrieved common key information encrypting step of encrypting the retrieved common key information with the retrieved secret key;

a writing step of writing the encrypted security information, the common key information, and the music piece information to the determined type of the one of the music content recording destinations.

4. The non-transitory computer-readable storage medium according to claim 1, wherein the content ID is a security key.

5. A method of encrypting and recording music contents onto any one of plurality types of music content recording destinations with an electronic musical apparatus having a storage device, a temporary memory device, a memory device, and a processor coupled to the memory device, the method comprising:

a first storing step of storing in the storage device a secret key and a plurality of target IDs each unique to one of the plurality types of music content recording destinations;

a second storing step of storing in the temporary memory device common key information, security information, and music piece information;

a determining step of determining a type of the one of the music content recording destinations;

a target ID retrieving step of retrieving the target ID of the determined type of the one of the music content recording destinations and the secret key from the storage device;

a first retrieving step of retrieving the common key information, the security information, and the music piece information from the temporary memory device, wherein the common key information includes a common key, wherein the security information includes copyright information and a content ID;

a content ID retrieving step of retrieving the content ID from the retrieved security information;

a retrieved music piece information encryption step of encrypting the retrieved music piece information using the retrieved content ID;

a common key retrieving step of retrieving the common key from the retrieved common key information;

a first key generating step of generating a first key using the retrieved common key and the retrieved target ID;

a security information encrypting step of encrypting the retrieved security information with the first key;

a retrieved common key information encrypting step of encrypting the retrieved common key information with the retrieved secret key;

a writing step of writing the encrypted security information, the common key information, and the music piece information to the determined type of the one of the music content recording destinations.

6. The method according to claim 1, wherein the content ID is a security key.

* * * * *